US008238756B2

(12) United States Patent
Genay et al.

(10) Patent No.: US 8,238,756 B2
(45) Date of Patent: Aug. 7, 2012

(54) LONG-REACH PASSIVE OPTICAL NETWORK USING REMOTE MODULATION OF AN AMPLIFICATION OPTICAL SIGNAL

(75) Inventors: Naveena Genay, Lannion (FR); Erwan Pincemin, Gommenec'h (FR); Bertrand Le Guyader, Trevou Treguignec (FR)

(73) Assignee: France Telecom, Paris (FR)

( * ) Notice: Subject to any disclaimer, the term of this patent is extended or adjusted under 35 U.S.C. 154(b) by 627 days.

(21) Appl. No.: 12/374,459

(22) PCT Filed: Jul. 17, 2007

(86) PCT No.: PCT/FR2007/051673
§ 371 (c)(1),
(2), (4) Date: Jan. 20, 2009

(87) PCT Pub. No.: WO2008/009849
PCT Pub. Date: Jan. 24, 2008

(65) Prior Publication Data
US 2009/0269059 A1    Oct. 29, 2009

(30) Foreign Application Priority Data
Jul. 20, 2006  (FR) .................................. 06 53039

(51) Int. Cl.
*H04J 14/00* (2006.01)
*H04B 10/17* (2006.01)
(52) U.S. Cl. .............. 398/175; 398/66; 398/67; 398/68; 398/178; 398/70; 398/71; 398/72; 398/168
(58) Field of Classification Search .............. 398/66–73, 398/173–181, 168
See application file for complete search history.

(56) References Cited

U.S. PATENT DOCUMENTS

| 4,775,971 | A | 10/1988 | Bergmann | 370/3 |
| 5,696,615 | A * | 12/1997 | Alexander | 398/92 |
| 2003/0118280 | A1 | 6/2003 | Miyazaki et al. | 385/24 |
| 2004/0001718 | A1* | 1/2004 | Matthews et al. | 398/98 |
| 2004/0091265 | A1* | 5/2004 | Kim et al. | 398/72 |
| 2006/0127093 | A1* | 6/2006 | Park et al. | 398/75 |
| 2006/0140631 | A1* | 6/2006 | Brolin | 398/79 |
| 2006/0275037 | A1* | 12/2006 | Evans et al. | 398/71 |

FOREIGN PATENT DOCUMENTS
EP    1 435 701 A2    7/2004
FR    2 685 150 A1    6/1993

OTHER PUBLICATIONS

International Search Report and written opinion from counterpart foreign application No. PCT/FR2007/051673.
English Translation of the Written Opinion dated Feb. 14, 2008 for corresponding International Application No. PCT/FR2007/051673, filed Jul. 17, 2007.

* cited by examiner

*Primary Examiner* — Jessica Stultz
*Assistant Examiner* — Michael Carter
(74) *Attorney, Agent, or Firm* — David D. Brush; Westman, Champlin & Kelly, P.A.

(57) ABSTRACT

A passive optical network is provided, which includes an optical central office connected to a line termination device by a branch of the network including a passive amplification medium. The central office is adapted to send/receive a first data optical signal and has a first amplifier for sending a second amplification optical signal. The second signal exciting the amplification medium to amplify the optical power of an optical signal. The line termination device is adapted to receive the first optical signal, modulate the second amplification optical signal; and inject the modulated second signal into the network.

11 Claims, 2 Drawing Sheets

LONG-REACH PASSIVE OPTICAL NETWORK USING REMOTE MODULATION OF AN AMPLIFICATION OPTICAL SIGNAL

CROSS-REFERENCE TO RELATED APPLICATIONS

This application is a Section 371 National Stage Application of International Application No. PCT/FR2007/051673, filed Jul. 17, 2007 and published as WO 2008/009849 on Jan. 24, 2008, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The disclosure relates to optical access networks and more particularly to access networks in the form of passive optical networks (PON).

BACKGROUND OF THE DISCLOSURE

Standard passive optical access networks have a range of the order of 20 kilometers (km). This limited range is linked to the fact that in passive optical networks the optical components, for example couplers, multiplexers and optical fibers, cause signals in transit in the network to lose optical power, and the signals being transmitted cannot be amplified to compensate such losses without incurring constraints. In a passive optical network the downlink optical signals, i.e. the optical signals sent by the central office to users, and the uplink optical signals, i.e. the optical signals sent by user equipments to the optical central office, are carried by a single optical fiber. This reduces the cost of the network. However, using a single optical fiber to carry the uplink and downlink optical signals introduces constraints on the power at which those optical signals are transmitted, which leads to the limited range of the network.

Although the range of passive optical access networks is sufficient in urban areas, where users are at relatively short distances from the optical central offices, of the order of 5 km to 10 km, this does not apply to users in rural areas, where users are often geographically dispersed and are therefore usually situated at a distance from the optical central offices greater than the standard range of a passive optical network. Those users are therefore unable to benefit from the high transmission bit rates offered by passive optical networks and thus from the services on offer that require a high bit rate connection.

The inventors of the present patent application have previously constructed a long-reach passive optical network described in French patent application No. 06/52705 in the name of the same applicants as the present patent application. It is a point-to-multipoint network, for example, as shown in FIG. 1. An optical central office OC constitutes a first end of the network. A first end of an optical fiber 14 is connected to the output of the optical central office OC. A second end of the optical fiber 14 is connected to the input of an optical coupler 15 having one input and N outputs, N representing the number of branches in the network. The optical fiber 14 is referred to as the main branch of the network. A first end of an optical fiber $16_j$, $j \in \{1, 2, \ldots, N\}$, is connected to one of the N outputs $S_j$ of the optical coupler 15. A second end of the optical fiber $16_j$ is connected to a line termination device $17_i$, $i \in \{1, 2, \ldots, N\}$ to which one or more users are connected. The optical fibers $16_1$ to $16_N$ are referred to as secondary branches of the network.

The optical central office OC includes a first laser 10 producing an optical signal associated with a particular wavelength. In the network this optical signal carries data addressed to users connected in accordance with the time division multiplexing principle. The optical central office also includes a second laser diode 110 producing an amplification optical signal associated with a particular wavelength different from the wavelength associated with the data optical signal.

In a network of that kind, a section 18 of erbium-doped optical fiber is inserted into the main optical fiber 14. The optical fiber section 18 serves as a passive amplification medium.

The amplification optical signal from the first laser diode 110 excites the erbium atoms in the optical fiber section 18. When the erbium atoms return to their non-excited state, they release photons in accordance with the stimulated emission principle, at a wavelength that corresponds to the wavelength of the data optical signal in transit in the network. These photons increase the optical power of the data signal. That technique is called remote amplification because the amplification medium 18 is in the network but the amplification means, here the laser diode 110, are in the optical central office OC. Thus by increasing the optical power of the data signal I, it is possible to make it travel a greater distance. That kind of network can achieve a range of the order of one hundred kilometers.

Other media and other in-line passive amplification techniques exist, of course, such as the Raman effect amplification technique, which uses the optical fiber 14 as an amplification medium.

However, although using passive amplification media reduces the costs of a passive optical network, passive optical access networks continue to be costly for telecommunications operators. The terminations of such passive optical networks are equipped with numerous costly components that consume electrical power, such as lasers producing the data signals, laser diodes serving as amplification means, and active transmission means disposed in the line termination devices. Moreover, such networks serve a large number of users, which increases the number of such components and therefore the cost of the network. There is therefore a need to reduce further the operating costs of such passive optical networks.

SUMMARY

An aspect of the disclosure addresses this need to reduce the operating costs of a passive optical network without introducing additional components into the network.

An aspect of the disclosure relates to a passive optical network including an optical central office connected to a line terminal equipment by a branch of said network including a passive amplification medium, said central office including:
  means for sending/receiving a first data optical signal;
  first amplification means including means for sending a second amplification optical signal, said second signal exciting the amplification medium to amplify the optical power of an optical signal; and said line termination device including:
means for receiving the first optical signal;
means for modulating the second amplification optical signal; and
means for injecting the modulated second signal into said network.

The second amplification signal is a continuous signal transmitted by the transmission means of the amplification means in the optical central office in order to excite the amplification medium in a branch of the network of an embodiment of the invention. These transmission means of the amplification means are commonly called pumps. The continuous second amplification optical signal at the output of the pump does not carry any data. An embodiment of the invention proposes to use this signal in the line termination devices to carry data addressed to the optical central office, i.e. in the uplink direction. Consequently, the second optical signal is modulated in the line termination device by the data it is to carry.

Thus according to an embodiment of the invention the second optical signal has two distinct functions. Firstly, it excites the amplification medium to increase the optical power of the downlink data signal and, secondly, it transmits data in the uplink direction.

Modulation of the second amplification optical signal by modulation means in each line termination device eliminates the active transmission means in standard line termination devices. Given the number of users that can be connected to an passive optical access network, eliminating the active transmission means in the line termination devices significantly reduces network operating costs.

According to one feature of the network of an embodiment of the invention, the network includes:
means for separating the first and second optical signals;
means for amplifying said second optical signal; and
said means for modulating the second optical signal are connected to the output of the means for separating the first and second signals and to the input of the means for amplifying said second optical signal.

In an implementation of an embodiment of the present invention, the modulation means consist of an electro-absorption modulator, the means for separating the first and second signals consist of a Bragg grating, and, finally, the amplification means consist of a semiconductor amplifier. These individual optical components are all mass-produced and available off the shelf. Thus a line termination device conforming to an embodiment of the invention of this kind is of relatively low cost.

In a first embodiment of the network of the invention, the branch of the network includes a first optical fiber and the first amplification means include first means for sending the second amplification optical signal and second means for sending a third amplification optical signal for amplifying said second optical signal.

In this embodiment, the downlink and uplink signals travel in the same optical fiber. The optical power at which the second amplification signal, also used to carry data in the uplink direction, is transmitted must not exceed a value beyond which Rayleigh backscattering, which is harmful to the receiver, occurs. For the second optical signal to be able to reach the line termination device with sufficient power to be modulated, its optical power must be increased. This is why the first amplification means include second transmission means, which constitute a second pump, the function of which is to excite the passive amplification medium to increase the optical power of the second optical signal. The optical signal from this second pump does not amplify the optical power of the first data signal. Moreover, the third optical signal increases the optical power of the second optical signal both in the downlink direction and in the uplink direction.

In a second embodiment of the network of the invention, in which the network includes at least two line termination devices each connected by respective first and second branches of the network to a distribution element connected to the optical central office by a third branch of the network, the network further includes second amplification means connected to said distribution element and adapted to amplify the optical power of an optical signal to be distributed by said distribution element.

Disposing transmission means of the second amplification means constituting a third pump near the distribution element makes it possible to share the pump between the various line termination devices and thereby to reduce network costs.

In another embodiment of the network of the invention, the branch of the network includes a second optical fiber, the first optical fiber carrying the first and second signals to the line termination device and the second optical fiber carrying the modulated second signal to the optical central office.

Separating the downlink and uplink directions prevents reception of the second signal modulated by the receiving means of the optical central office being disrupted by Rayleigh backscattering caused by reflection of part of the second optical signal at the line termination device.

Because the downlink and uplink signals travel in two separate optical fibers, it is possible to increase the power of the laser diode. The optical power of the first data signal can then be further increased. Thus a single amplification medium can suffice.

The first and second transmission means of the first and second amplification means advantageously comprise a laser diode.

Such optical components are mass produced and consequently of relatively low cost.

An embodiment of the invention finally provides a line termination device of a passive optical network adapted to receive a first data optical signal, said device including:
means for receiving the first optical signal;
means for separating said first and a second amplification optical signal;
means for modulating the second amplification optical signal;
means for amplifying the modulated second optical signal;
means for injecting the modulated second signal into said network;
said modulating means being connected to the output of the means for separating the first and second signals and to the input of the amplification means.

According to one feature of the line termination device of an embodiment of the invention, the means for separating the first and second optical signals include a Bragg grating, the means for modulating the second optical signal include an electro-absorption modulator, and the amplification means include a semiconductor optical amplifier.

Such optical components are of relatively low cost because they are in widespread use.

BRIEF DESCRIPTION OF THE DRAWINGS

Other features and advantages become apparent on reading the description of preferred embodiments of the invention given with reference to the drawings, in which.

DETAILED DESCRIPTION OF ILLUSTRATIVE EMBODIMENTS

Figure 1:
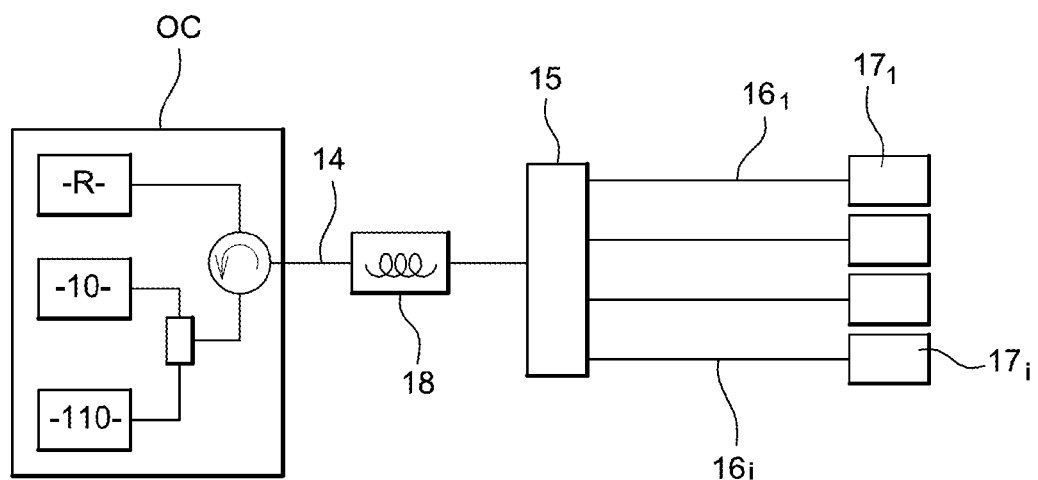
FIG. 1 represents a long-reach passive optical access network known to the inventors of the present patent application.
Figure 2:
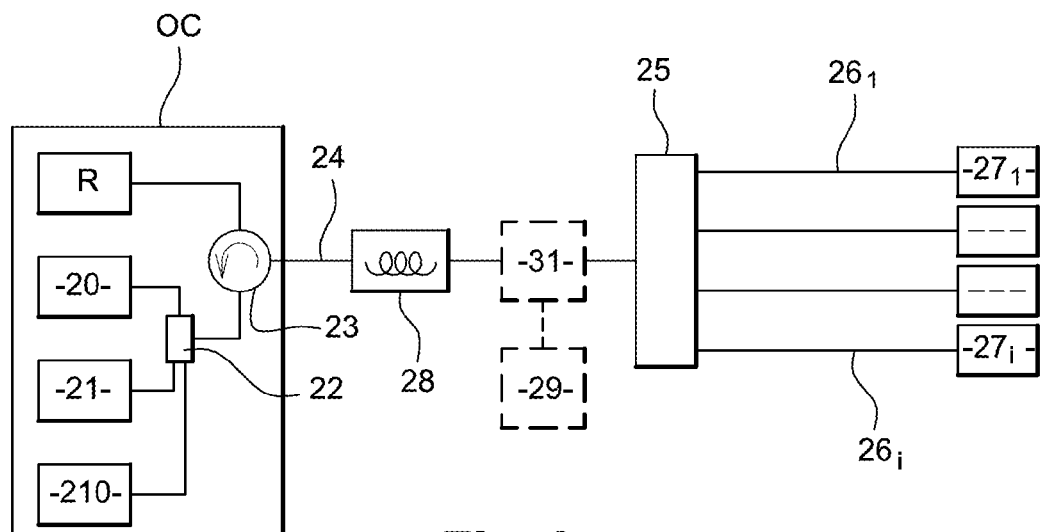
FIG. 2 represents a long-reach TDM passive optical network using the optical fiber and a section of erbium-doped optical fiber as amplification media.

FIG. 2 represents a long-reach TDM passive optical point-to-multipoint network conforming to a first embodiment of the invention. An optical central office OC constitutes a first end of the network. A first end of an optical fiber 24 is connected to the output of the optical central office OC. A second end of the optical fiber 24 is connected to the input of an optical coupler 25 having one input and N outputs, N representing the number of branches of the network. The optical fiber 24 is referred to as the main branch of the network. A first end of an optical fiber $26_j$, j∈{1, 2, . . . , N}, is connected to one of the N outputs $S_j$ of the optical coupler 25. A second end of the optical fiber $26_j$ is connected to a line termination device $27_i$, i∈{1, 2, . . . , N}, to which one or more users are connected. The optical fibers $26_1$ to $26_N$ are referred to as secondary branches of the network.

The optical central office OC includes a first laser 20 producing a first optical signal associated with a particular wavelength. In the network this first optical signal carries data sent to various users connected in accordance with the time division multiplexing principle. The optical central office also includes a second laser diode 210 producing a second amplification optical signal associated with a particular wavelength different from the wavelength associated with the first data optical signal and a third laser diode 21 producing a third amplification optical signal associated with a particular wavelength different from the previous two wavelengths. The second and third amplification optical signals are continuous signals, i.e. they do not carry data in the downlink direction.

The outputs of the laser 20 and the laser diodes 210 and 21 are each connected to an input of a 3:1 optical multiplexer 22 that has three inputs and one output. The optical central office OC also includes a module R for receiving signals sent by the line termination devices $27_1$ to $27_N$. The output of the optical multiplexer 22 and the input of the receiver module R are each connected to an input of a three-port optical circulator 23. A first end of the optical fiber 24 is connected to the third port of the optical circulator 23, firstly enabling the signals produced by the laser 20 and the laser diodes 210 and 21 to pass through the network toward the line termination devices $27_1$ to $27_N$ and secondly enabling the signals sent by the line termination devices to pass through the network toward the optical central office OC and the receiver means R.

Each of the optical fibers 24 and $26_1$ to $26_N$ constituting the network enables bidirectional transmission of optical signals in the network; in other words, the same optical fiber carries uplink signals from a line termination device to the optical central office and downlink signals from the optical central office to the line termination devices. This reduces the cost of installing the network and facilitates maintenance.

In this embodiment, a section 28 of erbium-doped optical fiber is inserted into the main optical fiber 24. This optical fiber section 28 serves as a passive amplification medium for the data optical signal. This amplification medium is excited by the amplification optical signal produced by the laser diode 210 and therefore amplifies the data optical signal. This amplification technique is referred to as remote optical pumped amplification (ROPA).

In an embodiment of the invention not shown in the figures, a section 28 of erbium-doped optical fiber is inserted into one or more of the secondary branches $26_1$ to $26_N$ of the network.

To reduce network operating costs, the inventors of the present patent application propose to eliminate the transmission means present in standard line termination devices.

Figure 3:
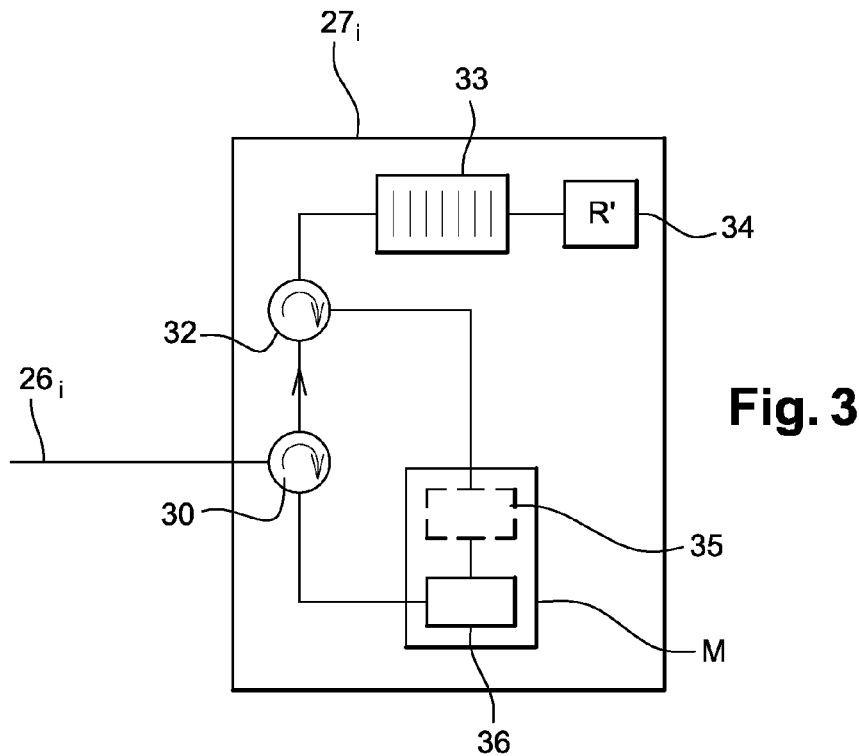
FIG. 3 represents a line termination device of an embodiment of the invention.

FIG. 3 represents a line termination device $27_i$ of an embodiment of the invention, which includes a first optical circulator 30 the operating principle of which is the same as that of the circulator 23. A first port of the optical circulator 30 is connected to a first input port of a second optical circulator 32. A second port of the second optical circulator 32 is connected to the input of a Bragg grating 33. The Bragg grating 33 is connected to receiver means R' for receiving the downlink data optical signal. The Bragg grating 33 separates the first data optical signal from the second amplification optical signal when they reach the input of the line termination device $27_i$. The Bragg grating 33 reflects the second optical signal and allows the first data optical signal to pass through it to the receiver means R'.

The second optical signal reflected in this way is sent via a third port of the second circulator 32 to the input of a modulator 35 for modulating an optical signal, for example an electro-absorption modulator (EAM) adapted to modulate the second optical signal with data to be sent to the optical central office. The electro-absorption modulator receives the data with which the second optical signal is to be modulated in the form of an electrical signal. Once the second optical signal has been modulated by the data to be sent to the optical central office OC, it is sent to the input of a semiconductor optical amplifier 36 which amplifies the optical power of the modulated signal. Finally, the output of the semiconductor optical amplifier 36 is connected to a second port of the optical circulator 30. The third port of the circulator 30 being connected to the optical fiber $26_j$, it injects the modulated signal into the branch of the network going to the optical central office. The electro-absorption modulator 35 and the semiconductor optical amplifier 36 constitute means M for modulating and amplifying the amplification signal.

In this embodiment, the second laser diode 21 ensures that the second amplification optical signal reaches the line termination device $27_i$. It emits a third amplification signal for exciting the optical fiber 24, which then becomes the amplification medium. On passing through the optical fiber 24, the optical power of the second amplification signal produced by the laser diode 210 is increased. This technique uses the RAMAN effect to produce amplification distributed over the whole length of the optical fiber.

For example, if the data optical signal is at a wavelength of 1550 nanometers (nm), the second optical signal produced by the laser diode 210 must be at a wavelength of 1480 nm. To increase the optical power of the second amplification signal produced by the laser diode 210, the third amplification signal produced by the laser diode 21 must be at a wavelength of 1380 nm.

Finally, because these two signals are associated with the same wavelength, the second optical signal modulated in the line termination devices and injected into the network to send it to the optical central office has its optical power amplified on passing through the optical fiber 24, just like the second amplification signal produced by the laser diode 210.

| DOWNLINK DIRECTION | |
| --- | --- |
| Fiber losses at 1550 nm | 20 dB (SSMF) |
| In-line optical components | 15 dB (1:32 coupler); 6 dB (WDM multiplexer + circulators) |
| Central office transmitter power | 12 dBm |
| ROPA gain | 10 dB |
| Power balance | −19 dBm |

| UPLINK DIRECTION | |
| --- | --- |
| Round trip fiber losses at 1480 nm | 2 × 25 dB (SSMF) |
| In-line optical components | 2 × 15 dB (1:32 coupler); 2 × 6 dB (WDM multiplexer + circulators) |
| Central office pump power | 23 dBm |
| Copropagating Raman gain at 1480 nm (downlink) | 25 dB |
| Contrapropagating Raman gain at 1480 nm (uplink) | 20 dB |
| SOA gain | 20 dB |
| Rayleigh backscattering | −12 dBm |
| Power received at central office at 1480 nm | +1 dBm |

The above two tables gives examples of the optical power balances in the downlink and uplink directions for a network including two amplification media 24 and 28.

These tables show that the optical budgets for the downlink and uplink transmission directions balance. In the uplink direction, the optical power received by the optical central office OC is greater than the power of the Rayleigh backscattering optical signal. The receiver means R in the optical central office OC are therefore not blinded by the backscattered signal and reception of the uplink data optical components is not disrupted.

Referring again to FIG. 2, a second embodiment of the present invention is described. In this embodiment, the optical fiber is the only amplification medium for the data and amplification optical signals.

In this embodiment, the second amplification optical signal produced by the laser diode 210 excites the optical fiber 24 and so when the data optical signal passes through the optical fiber 24 its optical power is increased. The third amplification optical signal produced by the laser diode 21 excites the optical fiber 24 so that the optical power of the second amplification optical signal produced by the laser diode 210 is increased as it travels through the optical fiber 24.

For example, if the data optical signal is at a wavelength of 1550 nm, the second optical signal produced by the laser diode 210 must be at a wavelength of 1450 nm. To increase the optical power of the second amplification signal produced by the laser diode 210, the third amplification signal produced by the laser diode 21 must be at a wavelength of 1350 nm.

Finally, because these two signals are associated with the same wavelength, the second optical signal modulated in the line termination devices and injected into the network to send it to the optical central office has its optical power amplified on passing through the optical fiber 24, just like the second amplification signal produced by the laser diode 210.

| DOWNLINK DIRECTION | |
| --- | --- |
| Fiber losses at 1550 nm | 20 dB (SSMF) |
| In-line optical components | 15 dB (1:32 coupler); 4 dB (WDM multiplexer + circulators) |
| Central office transmitter power | 10 dBm |
| Raman gain at 1550 nm | 10 dB |
| Power balance | −19 dBm |

| UPLINK DIRECTION | |
| --- | --- |
| Round trip fiber losses at 1450 nm | 2 × 25 dB (SSMF) |
| In-line optical components | 2 × 15 dB (1:32 coupler); 2 × 4 dB (WDM multiplexer + circulators) |
| Central office pump power at 1450 nm | 27 dBm |
| Downlink Raman gain at 1450 nm | 21 dB |
| Uplink Raman gain at 1450 nm | 21 dB |
| SOA gain | 20 dB |
| Rayleigh backscattering | −12 dBm |
| Power received at central office at 1480 nm | +1 dBm |

The above two tables give examples of the optical power balances in the downlink and uplink directions for a network including one amplification medium 24.

These tables show that the optical budgets for the downlink and uplink transmission directions are balanced. In the uplink direction, the optical power received by the optical central office OC is greater than the power of the Rayleigh backscattering optical signal. The receiver means R in the optical central office OC are therefore not blinded by the backscattered signal and reception of the uplink data optical components is not disrupted.

Referring again to FIG. 2, it is possible to connect a third laser diode 29 sending a fourth amplification optical signal to the input of the optical coupler 25 via the multiplexer 31. To prevent the amplification optical signals from the laser diodes 21 and 210 blinding the laser diode 29, an isolator is disposed between the multiplexer 31 and the laser diode 29. The fourth amplification optical signal from this third laser diode 29 is injected into the optical coupler 25 to amplify the uplink and downlink data optical signals. For example, the laser diode 29 produces an amplification optical component associated with a wavelength of 1380 nm in the embodiment of the present invention including two amplification media 24 and 28 or with a wavelength of 1350 nm in the embodiment in which the network includes only one amplification medium.

Sharing the third laser diode 29 reduces network costs by eliminating the amplification means in standard line termination devices.

Figure 4:
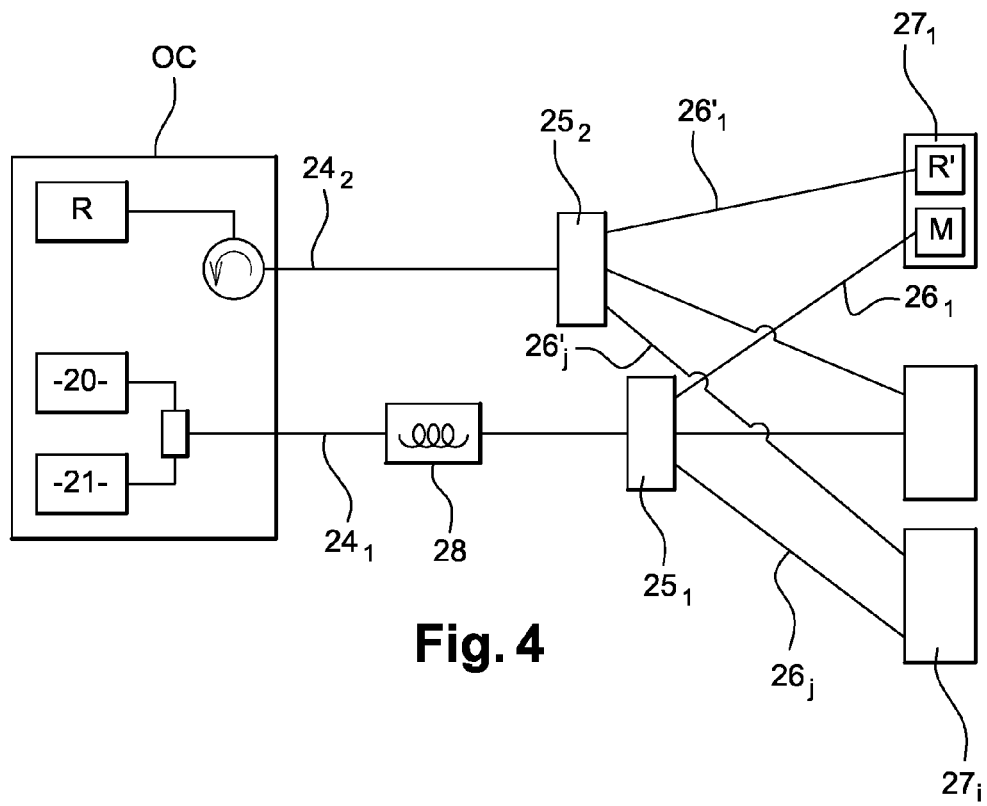
FIG. 4 represents a long-reach TDM passive optical network the branches of which comprise an optical fiber carrying uplink signals and an optical fiber carrying downlink signals.

FIG. 4 represents another embodiment of a long-reach TDM passive optical network. The components of the network common to the embodiments described with reference to the previous figures carry the same reference numbers and are not described again.

In this embodiment, the branches of the network comprise two optical fibers each dedicated to one direction of optical signals in transit in the network. Thus the main branch of the network consists of the optical fibers 24$_1$, and 24$_2$. The optical fiber 24$_1$, transports the optical signals produced by the laser 20 and the laser diode 21. The same applies to the secondary optical fibers 26$_1$, to 26$_N$. The main optical fiber 24$_2$ and the secondary optical fibers 26'$_1$ to 26'$_N$ transport the uplink modulated optical signal.

In this embodiment, the line termination devices $27_1$, to $27_N$ are modified to adapt them to this configuration with two optical fibers. Accordingly, in this device, the circulator 30 is dispensed with and the optical fiber $26_j$ is therefore connected directly to the first port of the circulator 32. The optical fiber $26'_j$ is connected to the output of the semiconductor optical amplifier 36, which enables the modulated optical signal to be transported to the optical central office OC.

Because the optical fibers $24_1$, and $26_1$, to $26_N$ are dedicated to the downlink communication direction, it is possible to increase the power of the data signal produced by the laser 20 and also the power of the second amplification signal produced by the laser diode 21 without risk of disrupting reception of the uplink modulated optical signal via the receiver means R of the optical central office. Transporting the downlink and uplink signals in separate optical fibers eliminates the Rayleigh backscattering effect which disrupts reception of the optical signals.

In a first embodiment, the passive amplification medium is a section 28 of erbium-doped fiber disposed in one of the optical fibers $24_1$, or $26_j$. In a second embodiment, the passive amplification medium consists of the optical fibers $24_1$, and $26_1$, to $26_N$.

| DOWNLINK DIRECTION | |
|---|---|
| Fiber losses at 1550 nm | 20 dB (SSMF) |
| In-line optical components | 15 dB (1:32 coupler); 4 dB (WDM multiplexer + circulators) |
| Central office transmitter power | 10 dBm |
| ROPA gain | 10 dB |
| Power balance | −19 dBm |

| UPLINK DIRECTION | |
|---|---|
| Round trip fiber losses at 1480 nm | 2 × 25 dB (SSMF) |
| In-line optical components | 2 × 15 dB (1:32 coupler); 6 dB (WDM multiplexer + circulators + isolator) |
| Central office pump power | 27 dBm |
| Subscriber premises SOA gain | 20 dB |
| Central office preamplifier gain | 20 dB |
| Power received at central office at 1480 nm | −19 dBm |

The above two tables give examples of the optical power balances in the downlink and uplink directions for a network the branches of which consist of two optical fibers, one for the uplink direction and one for the downlink direction, and in which the amplification medium consists of a section 28 of erbium-doped fiber amplifier.

In an embodiment that is not shown in the figures, it is possible to connect a third laser diode sending a third amplification optical signal to the input of the optical coupler $25_2$ via a multiplexer. To prevent the amplification optical signals from the laser diodes 20 and 210 blinding the third laser diode, an isolator is disposed between the multiplexer and the third laser diode. The third amplification optical signal from this third laser diode is injected into the optical coupler $25_2$ to amplify the uplink data optical signals. For example, in the embodiment of the present invention including a single amplification medium consisting of the optical fiber $24_2$, the laser diode sends an amplification optical component associated with a wavelength of 1350 nm.

Sharing the third laser diode reduces network costs by eliminating the amplification means included in standard line termination devices.

Whichever embodiment is chosen, it is not necessary to amplify the second amplification signal as in the embodiment in which the branches of the network consist of only one optical fiber, because the optical power of the amplification signal is greater in the embodiment with more than one optical fiber in each branch because there is no Rayleigh backscattering effect. Thus only the data optical signal must be amplified.

All embodiments of the present invention can be used in point-to-point optical networks. Such embodiments must include either an amplification laser for each branch of the network or a single laser and means enabling all branches of the network to share it.

Although the present disclosure has been described with reference to one or more examples, workers skilled in the art will recognize that changes may be made in form and detail without departing from the scope of the disclosure and/or the appended claims.

The invention claimed is:

1. A passive optical network comprising:
   a line termination device;
   an optical central office connected to said line termination device by a branch of said network including a passive amplification medium, said central office including:
      means for sending/receiving a data optical signal, called a first signal, through said branch; and
      first amplification means for sending an amplification optical signal, called a second signal, through said branch, said second signal exciting the passive amplification medium to amplify the optical power of the first signal; and
   said line termination device including:
      means for receiving the first signal from the branch;
      means for modulating the second signal to produce a modulated second signal; and
      means for injecting the modulated second signal into the branch of said network.

2. A passive optical network according to claim 1, wherein the line termination device further comprises:
   means for separating the first and second signals, connected to an input of said means for modulating said second signal; and
   means for amplifying said modulated second signal, connected to an output of said means for modulating said second signal.

3. A passive optical network according to claim 1 wherein the branch of the network includes a first optical fiber and the first amplification means include means for sending an amplification optical signal, called a third signal, to said branch for amplifying said second signal.

4. A passive optical network according to claim 3, wherein the branch of the network comprises a main branch and at least two secondary branches, the passive optical network including at least two line termination devices each connected by a respective one of the secondary branches of the network to a distribution element connected to the optical central office by the main branch of the network, wherein said network includes second amplification means connected to said distribution element and adapted to amplify the optical power of optical signals processed by said distribution element.

5. A passive optical network according to claim 1, wherein the branch of the network includes first and second optical fibers, the first optical fiber carrying the first and second signals to the line termination device and the second optical fiber carrying the modulated second signal to the optical central office.

6. A passive optical network according to claim 4, wherein the first and second amplification means include a laser diode.

7. A line termination device of a passive optical network adapted to receive a first signal, said device including:
- means for receiving first and second signals from the network, wherein the second signal is configured to excite a passive amplification medium in the network to amplify the optical power of the first signal;
- means for separating said first and second signals;
- means for modulating, connected to an output of the means for separating, for modulating the second signal to produce a modulated second signal;
- means for amplifying, having an input connected to an output of the means for modulating, for amplifying the modulated second signal to produce an amplified modulated second signal; and
- means for injecting the amplified modulated second signal into said network.

8. A line termination device according to claim 7, wherein the means for separating the first and second signals include a Bragg grating, the means for modulating the second signal include an electro-absorption modulator, and the means for amplifying include a semiconductor optical amplifier.

9. A method comprising:
- receiving first and second signals by a line termination device of a passive optical network, said second signal exciting a passive amplification medium in the network to amplify the optical power of the first signal;
- separating the first and second signals to produce separated first and second signals;
- modulating the separated second signal to produce a modulated second signal;
- amplifying the modulated second signal to produce an amplified modulated second signal; and
- injecting the amplified modulated second signal into the network.

10. A line termination device of a passive optical network, said device comprising:
- an optical separator, which is configured to separate a data optical signal from an amplification optical signal, which are received from the network, said amplification optical signal being configured to excite a passive amplification medium in the network to amplify the optical power of the data optical signal;
- a modulator, which is coupled to the optical separator to receive the amplification optical signal from the optical separator and modulate the amplification optical signal to produce a modulated optical signal; and
- an optical amplifier, which is coupled to amplify the modulated optical signal and produce an amplified modulated optical signal, wherein an output of the optical amplifier is coupled to inject the amplified modulated optical signal into said network.

11. The line termination device of claim 10, wherein the device is configured to receive the data optical signal and the amplification optical signal from a branch of the network, and wherein the optical amplifier is coupled to inject the amplified modulated signal into the branch.

* * * * *